3,352,796
CATALYST FOR HYDROCARBON CONVERSIONS
Charles Newton Kimberlin, Jr., and Elroy Merle Gladrow, Baton Rouge, La., assignors to Esso Research and Engineering Company, a corporation of Delaware
No Drawing. Filed Sept. 11, 1962, Ser. No. 222,924
10 Claims. (Cl. 252—455)

The present invention is concerned with means for obtaining improved crystalline alumino-silicate zeolite materials, the resulting compositions and their use in catalytic conversion processes. More particularly, it deals with the preparation of a crystalline alumino-silicate zeolite structure having a silica to alumina mole ratio above 3 and distributed throughout a siliceous matrix in a manner resulting in a highly porous and/or spherical structure.

Crystalline metallic alumino-silicate zeolites, often loosely termed "molecular sieves" are well known in the art. They are characterized by their highly ordered crystalline structure and have pores of nearly uniform dimensions in the general range of about 4 to 15 A. It has recently been suggested that such zeolites, particularly after metal exchange to reduce their $Na_2O$ content, can be employed as catalysts for various processes, particularly hydrocarbon conversion processes. However, one of the many problems encountered in using such crystalline alumino-silicate zeolites in many commercial operations, etc., moving or fluidized bed processes, has been the difficulty of handling the extremely fine size zeolite crystals. In this form, they are too small to be employed successfully in such operations. They cannot be fluidized properly because of their size and still be retained in the circulating catalyst stream. Additionally, such crystalline metallic alumino-silicate zeolites are unsuitable for direct use as catalyst because of their extremely high catalytic activity for certain hydrocarbon conversion processes. Hence, in reactions which are extensively exothermic or endothermic in nature, temperature control of the catalytic unit becomes a problem.

In accordance with the present invention, means are taught for forming a highly active, as well as selective, catalyst composition suitable for use in various conversion processes, and particularly fluidized bed operations. More particularly, a crystalline alumino-silicate zeolite having an effective pore diameter of 6 to 15 A. and a silica to alumina mole ratio above 3 is composited with silica, normally by the formation of a silica hydrogel which is thereafter admixed with a crystalline alumino-silicate zeolite. It is highly important that the crystalline alumino-silicate zeolite have a molar ratio of silica to alumina above 3. The resulting structure formed in accordance with the present invention, i.e., zeolite distributed through a siliceous matrix has, when the zeolite is characterized by a silica to alumina ratio above 3, an extremely high activity with respect to its catalytic ability and exhibits substantially better results than a zeolite which has a silica/alumina ratio of less than 3. In general the chemical formula of the anhydrous crystalline alumino-silicate zeolite, employed in the present invention, expressed in terms of moles may be represented as:

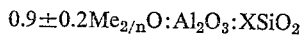

Wherein Me is selected from the group consisting of metal cations and hydrogen, $n$ is its valence, and X is a number above 3, e.g. 4 to 14, preferably 4.5 to 6.5. An example of a natural zeolite conforming to the above formula is faujasite. Recently produced synthetic mordenite or the hydrogen form of mordenite, which has an effective pore diameter of about 10 A. is also within contemplation of the present invention as is the use of type "13Y" crystalline alumino-silicate zeolites.

In a further embodiment of the present invention, it is particularly preferred, when it is desired to employ the resulting crystalline zeolite embedded in a siliceous matrix structure for fluidized bed operation, that the following process steps be employed. A silica sol is formed and its pH controlled to fall within the range of 4.8 to 6.5, preferably 5 to 6, during its conversion to a gel. Substantial improvements in porosity of both the gel and the ultimate structure formed after addition of the crystalline alumino-silicate zeolite, is thus obtained. In this operation, after the silica sol has been converted to the hydrogel it is reverted to the hydrosol (liquid state of polysilicic acid) and the crystalline alumino-silicate zeolite is added thereto. The resulting admixture is subjected to drying to form a composite. In a further preferred embodiment, the silica gel-crystalline alumino-silicate zeolite admixture formed is subjected to a spray drying step, i.e., sprayed through nozzles into a tower through which are flowing hot gases at a temperature at the nozzles in the range of 400 to 650° F., the resulting composite being characterized by its increased attrition resistance due to the spherical nature of the particles obtained by this procedure as well as excellent particle size distribution for fluidization, i.e., predominantly 20 to 80 micron average particle diameter. Thus, by forming the crystalline zeolite-siliceous matrix composite by control of the pH of the silica hydrosol during the formation of hydrogel and the subsequent spray drying of the resulting admixture of zeolite and silica sol, a highly porous solid, i.e., pore volume of 0.40 to 0.80 cc./g. is obtained (with consequent easy access of reactants to and from the active catalyst sites), which has improved attrition resistance due to the spherical nature of the particles as compared with the jagged particles and less uniform particle size distribution obtained by other treatments such as drying and grinding the resulting composite.

Typically the silica hydrosol is formed by percolating sodium silicate through a cation exchange resin to form hydrosilicic acid solution containing 1 to 25%, preferably 2 to 6% silica solids. The pH of the resulting hydrosol is then controlled to convert the hydrosol to a hydrogel via the formation of polysilicic acid. A pH of 5 to 6 and a holding period of about 8 to 24 hours at room temperature is normally preferred. Thereafter the hydrogel is temporarily reverted to a hydrosol (liquid state of polysilicic acid) by breaking the gel up by severe mixing and/or agitation, e.g., paddling, accompanied by further addition of water in amounts of up to 25% of the hydrogel if needed to establish adequate fluidity for pumping. The slurry may then be passed to a colloid mill. A slurry of zeolite, i.e., 1 to 30 wt. percent zeolite in water, is then added in amounts of 0.04 to 0.33, preferably 0.05 to 0.10 parts by weight of zeolite per part of $SiO_2$ and the resulting admixture thoroughly mixed prior to drying, e.g., by passage to the spray drier.

In general, sufficient colloidal silica is employed so that the final dried crystalline alumino-silicate-siliceous product will contain 1 to 99, preferably 5 to 25 wt. percent of metallic alumino-silicate zeolite, the remainder being siliceous matrix. The zeolite may have been base exchanged with various cations prior to admixture with said silica hydrogel or alternatively, but less desirably, the resulting composite of zeolite and silica may be subjected to base exchange. The composite may be subjected to a washing step to remove water soluble material prior to drying of the resulting composite, e.g., spray drying. The resulting structure, after drying, is normally subjected to a calcination treatment at a temperature in excess of 500° F., e.g. 500–1500° F. for 8 to 24 hours. It may also be subjected to a steam treatment at these temperature levels, e.g. 5–30 hours at 850 to 1200° F.

As noted previously, it is important that the crystalline alumino-silicate zeolite having an effective pore diameter of 6 to 15 A. have a silica to alumina molar ratio above 3. Normally, such zeolites are prepared in the following manner: Colloidal silica, such as commercial Ludox, is mixed with a solution of sodium hydroxide and sodium aluminate at ambient temperatures. The reaction mixture is allowed to digest at these temperatures for periods up to 40 hours or more, e.g., 24 hours. The reaction mixture is then heated to 180 to 250° F., preferably 200 to 220° F., for periods of 24 to 200 hours, preferably 50 to 100 hours. It is highly important during this step that the ratio of ingredients fall within specific ranges as indicated in Table I in order that the zeolites have the necessary silica to alumina mole ratio. Crystalline metallic alumino-silicate is then separated from the aqueous mother liquor by decantation and washed and there is thus recovered a crystalline alumino-silicate product having a silica to alumina ratio of above three as well as an average particle size of about 0.05 to 5 microns (too small for use directly).

TABLE I

| Reactants (Mole Ratio) | Present Composition | Lower $SiO_2/Al_2O_3$ Zeolites |
|---|---|---|
| $Na_2O/SiO_2$ | 0.2 to 0.8, preferably 0.28–0.45 | 0.7–1.5 |
| $SiO_2/Al_2O_3$ | 8 to 30, especially 10–12 | 2.5–5 |
| Resulting Product—$SiO_2/Al_2O_3$ | Over 3, especially 5–6 | <3 |

In those applications wherein the crystalline alumino-silicate zeolite is to be employed as a catalyst, it is highly desirable to have subjected crystalline zeolite crystals to exchange with a metal cation or a hydrogen containing cation so as to reduce the sodium content ($Na_2O$) to less than 10 wt. percent and preferably to about 1.0 to 5.0 wt. percent (based on zeolite crystals). The metal cation can be any metal of Groups I to VIII and the rare earth metals, but preferably is a member of the group consisting of Groups II, III, IV, VI–B, VII–B, VIII and rare earth metals. Particularly preferred when employing the catalyst for subjecting hydrocarbons to cracking are the alkaline earth metals and especially magnesium and/or calcium. Examples of the above metal cations are the following: calcium, aluminum, barium, cadmium, rare earth metals such as cerium, praseodymium, lanthanum, neodymium and samarium; chromium, cobalt, copper, iron, lead, lithium, manganese, nickel, silver, strontium, zinc, tin, platinum, palladium, molybdenum, vanadium, rhodium, and zirconium. The hydrogen containing cation is preferably a hydrogen ion or an ammonium ion.

Base exchange may be effected after mixing the silica sol and zeolite by exchanging the resulting product with an aqueous solution of the cation to replace the alkali metal and washing the base exchanged material free of soluble ions prior to drying. Alternatively the base exchange step may be effected after drying the silica sol-crystalline zeolite composite. However, it is normally preferred to have subjected the zeolite to exchange prior to admixture with the silica hydrogel. Normally, the zeolite is exchanged with a suitable salt solution of the above metals or the hydrogen containing cation at a temperature of 60 to 150° F. via conventional ion exchange techniques. In general, at least two-thirds of the soda which may originally have been present in the zeolite is exchanged with the catalytic metal or hydrogen cation so that the resulting exchanged, coated crystalline alumino-silicate zeolite contains at least 1 to 2 wt. percent, preferably 3 to 20 wt. percent based on zeolite of these metals as catalytic agent. Suitable salt solution, e.g., magnesium sulfate, calcium chloride, barium chloride, iron sulfate, etc., or alternatively a hydrogen containing cation, e.g., ammonium hydroxide, ammonium chloride, etc., are readily reacted with the sodium form of the zeolite to give the exchanged zeolite desired.

Catalytic materials similar to that described in U.S. Patent 2,971,904 may be readily made from the above base exchanged coated zeolites by thereafter impregnating with a suitable metal. For example, platinum group metals, such as palladium, platinum and rhodium, or other metals such as molybdenum, chromium, vanadium, cobalt, nickel, copper, silver, manganese may be deposited on the base exchanged crystalline alumino-silicate zeolite embedded in a siliceous matrix to give a catalytic material characterized by a coated alumino-silicate zeolite in which a substantial portion of the alkali metal has been replaced and which contains a metal deposited thereon.

As indicated previously, the present large pore zeolites embedded in a siliceous matrix wherein said zeolites have a silica to alumina mole ratio above 3 have been found to exhibit excellent properties with respect to catalytic ability as well as attrition resistance and porosity. Such materials can be used in catalytic cracking, hydrocracking, hydrogenation, oxidation, alkylation as well as hydroisomerization, and polymerization of olefins. Standard conditions of temperature and pressure may be employed, e.g., cracking at 875° to 980° F.

While it is highly desired to form the zeolite structures of the present invention by reaction of a silica hydrogel and the crystalline alumino-silicate zeolite particles, advantages may also be obtained by a dry mixing or physically compositing silica with the exchanged form of zeolite having a silica to alumina mole ratio above 3. In this embodiment for example, after physically mixing silica gel with the exchange form of the crystalline alumino-silicate zeolite, it may be subjected to a mixing or grinding operation to insure intimate contact between the components and thereafter shaped into various physical configurations. The shaping operation may comprise drying, grinding and sizing of the material followed by pelleting, or may involve extruding a thick paste of the composite material to the desired size and shape.

By way of clarifying nomenclature, the term "coated crystalline alumino-silicate zeolite" is used in the present specification to denote the composition wherein the crystalline alumino-silicate particles are suspended in and distributed throughout the matrix of an amorphous and highly porous siliceous material. Thus, although the zeolite is partially or entirely enclosed or embedded in the siliceous material, there is still provided sufficient means for access of molecules to and from the zeolite pore openings so as to provide the known attributes of crystalline alumino-silicate materials.

The various aspects and modifications of the present invention will be made more clearly apparent by reference to the following examples and accompanying description.

*Example 1*

A crystalline alumino-silicate zeolite, having uniform size pore openings in the range of 6 to 15 A. and having a silica to alumina mole ratio above 3 was prepared in the following manner. This zeolite subsequently utilized in the following experiments is denoted as crystalline alumino-silicate zeolite A.

A solution of 30.0 kilograms of NaOH and 8.5 kilograms of sodium aluminate in 107.5 liters of water was added with stirring to 193.0 kilograms of low soda Ludox (30 wt. percent $SiO_2$ hydrosol) contained in a 200 gallon steam jacketed vessel. Mixing was conducted at ambient temperatures. Stirring was continued until the mixture was homogeneous, and then the mixture was heated to 210–215° F. and maintained there for 5½ days to effect crystallization. The crystals were removed from the liquor by filtering and water washing until the wash water showed a pH of 9.0–9.5. On drying, the crystalline aluminosilicate analyzed 13.9% $Na_2O$, 64.0% $SiO_2$, and 21.2% $Al_2O_3$. On a mole basis this corresponds to: 1.08 $Na_2O \cdot 1.0\ Al_2O_3 \cdot 5.1\ SiO_2$.

For the preparation of magnesium form of zeolite A the following was done. Twenty kilograms of the dried Na-zeolite were added to 50 gallons of a 6% by weight solution of $MgSO_4$. The slurry was stirred at ambient temperatures (70–80° F.) for 3 hours. Stirring was stopped and the solids allowed to settle out overnight. The supernatant liquor was removed by decantation. The crystals were washed by reslurrying in 50 gallons of water followed by settling and decantation. The exchange and washing procedure was repeated two more times using fresh 6% $MgSO_4$ solutions each time. Finally, water washing was continued until the wash water gave a negative test for sulfates with barium chloride. Analysis showed a zeolite containing 5% MgO and 3.85% $Na_2O$.

*Example 2*

This example illustrates the preparation of the catalyst of the present invention and illustrates that, when formed by spray drying, it is of a size most desirable for use in a fluidized solids system.

It is well known in the art that in the fluidized solids system of catalytic cracking that particle size and particle size distribution must be controlled. For example, it is known that the particles of catalyst should principally be in the range of 20 to 80 microns in diameter. Particles much smaller than 20 microns are difficult to retain with the cyclone separators when separating the catalyst from the overhead stream of gases. On the other hand, particles much larger than 80 microns are more difficult to fluidize. It is desirable that the bulk of the catalyst particles have a range of sizes and not any one predominant size in the 20–80 micron range.

The crystalline catalytic agent per se as formed as described in Example 1 had a size in the range of 0.05 to about 2 microns in size, mostly between 0.1 and 1.0 micron. This is too small to use in a fluidized solids system. To facilitate the use of the crystalline catalyst, it is composited with a suitable silica diluent, such as silica hydrosol, and spray dried to give a particle size distribution in the desirable range.

Commercial sodium silicate (40° Baumé, $Na_2O \cdot 3.25 SiO_2 \cdot XH_2O$) solution was diluted with water to bring the $SiO_2$ content to about 3.0% by weight. This solution was passed through a well washed column of H-form Amberlite IR–120 cation exchange resin. The latter material is commercially available from the Rohm and Haas Co., Philadelphia, Pa. The effluent comprises a 3% silica hydrosol, or polysilicic acid.

Twenty gallons of a 3% silica hydrosol were treated with 8 cc. of 28% $NH_3$ solution to bring the pH to about 5.0 and gelled. The hydrogel was broken up and reverted back to a hydrosol by passing it through a colloid mill and into a second vessel containing 312.5 grams of the magnesium form of the crystalline alumino-silicate (13% volatile material) described in Example 1 slurried in 1 gallon of water. After compositing the silica sol and crystalline components, the mixture was spray dried by introducing the hydrous slurry to a heated chamber with downflowing hot air at a temperature of 550–600° F. at the inlet and about 240° F. at the bottom of the drying chamber. The spray dried product was calcined at 1000° F. for 16 hours and then steamed at 1050° F. and 0 p.s.i.g pressure for 16 hours. The composite catalyst comprises 9 parts by weight of silica matrix and 1 part by weight of the crystalline magnesium alumino-silicate. It showed a surface area of 648 square meters per gram, a pore volume of 0.40 cubic centimeters per gram, an attrition rate of 2.2 percent per hour and had a particle size distribution as follows:

| Microns: | Percent |
|---|---|
| Less than 20 | 0.8 |
| 20–40 | 16.3 |
| 40–60 | 37.6 |
| 60–80 | 39.2 |
| Greater than 80 | 6.1 |

Thus by application of the method of the present invention, particle size of the composite catalyst is predominantly in the highly desirable range required for fluidized solids type catalytic cracking. As mentioned before, this is not possible by using just the crystalline catalytic material alone; or by the use of other compositing techniques such as grinding or crushing. Moreover, the spherical particles produced show improved attrition resistance as compared to the irregular shaped particles prepared by other processes, e.g., grinding.

*Example 3*

This example shows importance of controlling the pH to a range of 5 to 6 in the preparation of a pure polysilicic acid sol and how it affects the physical properties of the resulting material formed therefrom. Proper adjustment of the pH followed by a suitable aging time (up to 48 hours or more) before drying and calcining has a marked effect on the surface area, pore volume, and attrition rate (as measured in a Standard Roller Test), particularly after the silica has been subjected to steam.

In the following tabulation, portions of effluent 3% silica hydrosol (pH $3.0 \pm 0.2$) made as described in Example 2, were brought to different pH levels by the addition of $NH_4OH$, left to age for three days, spray dried and then calcined 16 hours at 1000° F., and finally steamed at 1050° F. and 0 p.s.i.g. pressure for 16 hours.

TABLE II

| Sample | A | B | C | D | E |
|---|---|---|---|---|---|
| pH | 3.0 | 4.5 | 5.0 | 5.8 | 7.6 |
| After Steaming as Above: | | | | | |
| Surface Area, M²/g | 192 | 442 | 648 | 615 | 452 |
| Pore Volume, cc./g | 0.10 | 0.28 | 0.61 | 0.70 | 0.37 |
| Attrition rate, percent/hr | 2.0 | 5.2 | 3.5 | 7.0 | 27.8 |

These data show that high pore volume silica gel results when the pH of the 3% hydrosol is adjusted to about 4.8 to 6.5, especially 5.0–6.0, and allowed to gel.

Thus in forming compositions of the present invention wherein silica gel is the porous diluent in a composite with the crystalline active catalyst, it is highly desirable to control the pH during conversion of the hydrosol to hydrogel to a value of 5 to 6 in order to get as high porosity (pore volume) as possible without sacrificing particle strength (attrition rate). This is to minimize any diffusion rate limitations on the activity of the active crystalline catalytic component due to the diluent.

*Example 4*

The following example illustrates the importance of the crystalline alumino-silicate zeolite having a silica to alumina mole ratio above 3 as compared with the use of similar zeolites having lower silica to alumina mole ratios.

The composition of Example 2, i.e., magnesium exchanged crystalline alumino-silicate zeolite embedded in a siliceous matrix wherein the zeolite had a silica to alumina mole ratio above 3, i.e., 5.1, was compared with (a) a similarly prepared composite catalyst but in which the silica to alumina mole ratio of the crystalline zeolite was less than 3, and (b) the magnesium form of the crystalline alumino silicate zeolite described in Example 1 containing no silica matrix in a fixed bed type catalytic cracking operation.

The zeolite which had a silica to alumina mole ratio of less than 3 has often been termed in the art as "type 13X molecular sieve." In the present example the zeolite had a silica to alumina mole ratio of about 2.7 and had been subjected to base exchange with the magnesium salt as well as compositing with silica component in precisely the same manner as described in Examples 1 and 2 with respect to the zeolite having a silica to alumina mole ratio greater than 3. The resulting composition thus also contained 9 parts of $SiO_2$ and one part of the magnesium form of the zeolite. The magnesium form of the high silica to alumina mole ratio zeolite was also tested and was that composition indicated in Example 1.

All three of the compositions were subjected to the same test procedure. Each composition was employed as a catalyst in a fixed bed unit to convert at 950° F. and a 30 minute cycle period an East Texas Light Gas Oil having a boiling range of about 500 to 660° F. and an API gravity of 33.3°. As used in Table III, the term "relative activity" is used to denote the ratio of the feed rates expressed as weight of hydrocarbon feed per weight of catalyst used per hour (w./hr./w.) required to give the same conversion level as the catalyst of the present invention.

TABLE III.—E. TEXAS LIGHT GAS OIL; 950° F.; 30 MINUTE CYCLE PERIOD

| | Catalyst | | |
|---|---|---|---|
| | Mg Form of Low Silica/Alumina Zeolite+9 Parts $SiO_2$ | Mg Form of High Silica/Alumina Zeolite+9 Parts $SiO_2$ | Mg Form of High Silica/Alumina Zeolite (no Siliceous Matrix) (Conversion Levels) |
| Conversion | 50 | 50 | 50 |
| Relative Activity | 0.4 | 1.0 | |
| Carbon, Wt. Percent | 1.8 | 1.4 | 3.1 |
| $C_4$ and Lighter Gas, Wt. Percent | 9.2 | 9.9 | 12.0 |
| $C_5$-430° F. Naphtha, Wt. Percent | 39.0 | 38.7 | 34.9 |

Shows higher activity and lower carbon makes for the high silica/alumina zeolite catalyst.

As shown in Table III, the compositions of the present invention show higher activity and lower carbon make than a composition made in precisely the same manner, but employing a crystalline alumino-silicate zeolite having a silica to alumina mol ratio of less than 3. Moreover, the present compositions show substantial advantages with respect to carbon and naphtha yields as compared to the use of the magnesium form of a high silica to alumina zeolite which has not been composited with or suspended in a siliceous matrix.

Example 5

This example compares the performance of the catalyst described in Example 2 with a commercial 25% $Al_2O_3$-75% $SiO_2$ gel catalyst in a continuous fluid unit operating at 930° F. using a mixed sweet heavy virgin gas oil feed, having a boiling range of 650 to 1050° F. and a gravity of 23.2° API. Both catalysts were steamed at 1050° F. and 0 p.s.i.g. pressure for 16 hours before evaluation. The commercial catalyst after steaming had a surface area of 363 m.²/g., a pore volume of 0.70 cc./gram, and an attrition rate of about 3% per hour.

TABLE IV

| | Catalyst | |
|---|---|---|
| | 90 Pts. $SiO_2$, 10 pts. Crystal. Mg-Alumino-Silicate of High $SiO_2/Al_2O_3$ Ratio | 25% $Al_2O_3$, 75% $SiO_2$ Gel |
| Conversion, 430° F.-, Vol. Percent | 75 | 75 |
| Feed rate, w./hr./w. | 15 | 7 |
| Catalyst/Oil Ratio | 9 | 8 |
| Carbon, Wt. Percent | 4.0 | 6.0 |
| $C_3^-$ Dry Gas, Wt. Percent | 8.5 | 13 |
| $C_4$, Vol. Percent | 16 | 24 |
| $C_5$-430° F., Vol. Percent | 55 | 46.5 |
| Res. O.N.+3 cc. TEL | 99.5 | 100.0 |

These results show that the commercial gel catalyst yields about 50% more carbon and dry gas than the blended crystalline catalyst of our invention. In addition this increased carbon and dry gas comes at the expense of $C_5$+ naphtha. The catalyst of the present invention shows about 8–9% more yield of naphtha with very little change in octane number quality when compared to standard commercial gel catalyst.

Example 6

This example shows that the activity of the silica-crystalline zeolite catalyst is a function of the concentration of the zeolite.

Thirty gallons of soft silica hydrogel (3% solids) having a pH of about 3.0 were composited with 1 gallon of a finely dispersed slurry of magnesium alumino-silicate of Example 1 (900 grams) using good stirring. The composite was blended further with 2 gallons of water to make it more fluid, and then spray dried. The dried material was made into 3/16" diameter x 1/4" long cylindrical pellets. After calcining at 1000° F., the catalyst was steamed at 1050° F. and 0 p.s.i.g. pressure for 16 hours. This catalyst, which comprises 80 wt. percent silica and 20 wt. percent magnesium-alumino-silicate is designated catalyst A.

In similar fashion, 30 gallons of the same batch of 3.0 pH silica hydrogel were admixed with a total of 6 gallons of water and 400 grams of the crystalline magnesium alumino-silicate of Example 1, using rapid and efficient stirring and then spray dried. The product was made into 3/16" diameter x 1/4" long cylindrical pellets, heated at 1000° F. for 16 hours and finally steamed at 1050° F., 0 p.s.i.g. pressure for 16 hours. This catalyst, which comprises about 90 wt. percent silica and only 10 wt. percent crystalline magnesium alumino-silicate is designated catalyst B.

Catalysts A and B were tested for cracking activity in fixed bed operation with a low sulfur light virgin gas oil feed described in Example 4 at 950° F. over a 30 minute cycle period. At a feed rate of 0.65 w./hr./w. catalyst A (20% crystalline content) gave a 430° F.-conversion of 67.47, whereas catalyst B (10% zeolite) at a lower feed rate of 0.56 w./hr./w. gave only 50.8% conversion.

In another set of experiments, the spray dried composite microspherical powdered catalysts A and B were tested in a batch fluid unit, using a high sulfur content (1.14% S) virgin gas oil feed boiling in the range of 600 to 750° F. and having a gravity of 26.9° API using a cracking cycle of 10 minutes at 950° F. At a feed rate of 2.23 w./hr./w. catalyst A gave a 430° F.-conversion of 72.2%, whereas catalyst B at the same feed rate gave a conversion of only 53.5%.

These data attest to the fact that the activity of the composite catalyst can be varied over a wide range merely by changing the composition of the blended catalyst.

Example 7

This example shows that the sodium form of the crystalline zeolite synthesized in Example 1 can be composited with silica hydrogel and the composite then treated with magnesium chloride to effect the preparation of an active and selective catalyst.

Eighteen gallons of a 3% silica hydrosol prepared as described in Example 2 were brought to pH 5.9 and allowed to gel by standing at ambient temperature for 20 hours. The gel was then broken up, passed through a colloid mill twice to revert it to a hydrosol, and finally added to a slurry of 240 grams of the sodium aluminosilicate prepared in Example 1 having the empirical formula $Na_2O \cdot Al_2O_3 \cdot 5.1\ SiO_2 \cdot XH_2O$ in three gallons of water. This corresponds to a composition of 10 parts $SiO_2$ and one part crystalline alumino-silicate. The composite slurry was placed in shallow trays and dried in an oven at 250° F. The product was ground to pass a 20 mesh screen and separated into two equal fractions, C and D.

Fraction C was shaped into 3/16″ x 1/4″ cylindrical pellets, calcined at 1000° F., and steamed at 1050° F. and 0 p.s.i.g. pressure for 16 hours. Chemical analysis showed 1.29% $Na_2O$ which corresponds to one part $Na_2O \cdot Al_2O_3 \cdot 5.1\ SiO_2$ and 10 parts $SiO_2$.

Fraction D ground powder was calcined 16 hours at 850° F. and then slurried in 8 liters of 5% $MgCl_2$ solution at 140–160° F. for two hours. The solids were allowed to settle out and the liquid was decanted and rejected. The solid was similarly treated with fresh 5% $MgCl_2$ solution three more times. Finally, the product was washed several times with water to remove residual soluble salts and then oven dried. The material was shaped into 3/16″ x 1/4″ cylindrical pellets, heated at 1000° F. and then steamed at 1050° F. and 0 p.s.i.g. pressure for 16 hours. The final composite material analyzed 0.19% $Na_2O$ and 0.58% $MgO$. On the basis of the composition, this corresponds to 10 parts $SiO_2$ as matrix with the crystalline component comprising $0.18\ Na_2O \cdot 0.82\ MgO \cdot Al_2O_3 \cdot 5\ SiO_2$. This shows that all of the magnesium in the final catalyst is associated with the crystalline component, leaving the silica matrix essentially free of residual soda or magnesia.

Catalysts C and D were tested for activity and selectivity in a fixed bed type cracking operation using a low sulfur light virgin gas oil feed at 950° F. and using a 30 minute cycle period.

TABLE V

| Catalyst | C (Na form) | D (Mg form) |
|---|---|---|
| Feed Rate, w./hr./w. | 0.85 | 1.37 |
| Conversion, 430° F.-, Wt. percent | 40.2 | 48.9 |
| Carbon, Wt. Percent | 1.5 | 1.3 |
| $C_4^-$ Gas, Wt. Percent | 5.7 | 8.8 |
| $C_5$–430° F. Naphtha, Wt. Percent | 33.0 | 38.7 |

These data show that catalyst D of the present invention is much more active than catalyst C, as shown by a higher conversion level at a higher feed rate and produces considerably less carbon. This improvement is due to the replacement of soda from the crystalline component of the blend with magnesium. Further, the example illustrates that base exchange of the zeolite may occur after compositing in the siliceous matrix.

Example 8

This example shows that the route used to make the catalyst of Example 2 (Mg-alumino silicate zeolite added to $SiO_2$ hydrogel) and the route used to make the catalyst D of Example 7 (exchange after zeolite added to silica) are alternate routes which yield essentially the same quality catalyst. The catalyst of Example 2 is denoted as catalyst A.

Catalysts D and A were tested in fixed bed operations at 950° F., 30 minute cycle period, using a low sulfur light virgin gas oil feed. The following data are adjusted so as to compare the catalysts at a 430° F.-conversion level of 50%.

TABLE VI

| Catalyst | D | A |
|---|---|---|
| Conversion, 430° F.-, Wt. Percent | 50 | 50 |
| Feed rate, w./hr./w. | 1.3 | 1.7 |
| Carbon, Wt. Percent | 1.5 | 1.5 |
| $C_4^-$ Gas, Wt. Percent | 9 | 9 |
| $C_5$–430° F. Naphtha, Wt. Percent | 39.5 | 39.5 |

Keeping in mind that catalyst D is a 10/1 blend of silica diluent with crystalline component and catalyst A is a 9/1 blend, it can be seen that activities of these catalysts are very close. As noted, there is no difference between the catalysts in their selectivity properties.

Example 9

This example describes the preparation of a silica-nickel crystalline zeolite catalyst having hydrogenation-dehydrogenation activity.

Five hundred grams of crystalline sodium aluminosilicate prepared as described in Example 1 and having a silica to alumina mole ratio of 4.2, were added to a solution comprising two liters $H_2O$ and 450 grams $NiCl_2 \cdot 6\ H_2O$. The slurry was stirred at ambient temperatures for several hours, filtered and washed with water on the filter. The cake was re-slurried in fresh solution of $NiCl_2 \cdot 6H_2O$ of the same quantity and concentration. The procedure was repeated until a total of 4 exchange treatments was completed. After the final water washing step, the cake was dried in an oven at 250° F. and then calcined 16 hours at 850° F. Analysis of the product showed 4.6% $Na_2O$ and 11.1% $NiO$ which is equivalent to removing about 67% of the soda from the original crystals.

Eighteen hundred grams of a 3% silica hydrosol prepared as described in Example 3 were placed in a vessel and brought to pH 5.0 with ammonia to effect gelation. The hydrogel was broken up with a paddle and composited with 250 cc. of a slurry containing 6.0 grams of the above nickel exchanged alumino-silicate. Oven dried at 250° F. After grinding and sizing the powder to 100–200 mesh size it was calcined at 1000° F. for 16 hours. This blended catalyst, comprising 90% silica matrix had a surface area of 589 square meters per gram, a pore volume of 0.71 cc./gram and an attrition rate of 7.9% per hour. Because of its composition this catalyst when reduced with $H_2$ should have extensive hydrogenation-dehydrogenation properties.

Example 10

A hydrocracking catalyst was prepared and tested in the following way and gave the following results.

The sodium alumino-silicate prepared as described in Example 1 and having an $SiO_2/Al_2O_3$ mole ratio of 5.1 was base exchanged with 6% $NH_4Cl$ solution brought to a pH of about 7.0 with addition of ammonia. The exchange treatment was repeated for a total of 8 treats at the end of which time the soda content of the residual alumino-silicate was less than 2.0% (thus preparing the "hydrogen" form of the zeolite). The crystalline product, after filtering and oven drying, was slurried in a dilute palladium ammonium chloride solution comprising sufficient palladium to incorporate 2.0% Pd. on the dried product. After contacting for about one hour, the palladium ions were all removed from solution as indicated by the disappearance of color within the solution. The product was filtered and dried to a 13% volatiles content. Fifty grams (dry basis) of oven dried material were physically mixed with 200 grams of silica gel (28 mesh and smaller). The silica gel had been previously steamed at 1050° F. and 0 p.s.i.g. pressure for 16 hours. The composite was then shaped into 3/16″ x 1/4″ cylindrical pellets. In a muffle furnace blanketed in dry nitrogen the catalyst pellets were slowly heated up to 700° F. over a 20 hour period, and held at 700° F. for an additional 3½ hours. The pellets, still blanketed with $N_2$, were transferred to a hydrocracking unit.

While maintaining the $N_2$ atmosphere, the catalyst was brought up to 950° F. at the rate of about 100° F./hr. and at one atmosphere pressure. When 950° F. was reached, the $N_2$ was replaced with $H_2$. The temperature was kept at 950° F. for 16 hours with $H_2$ slowly flowing over it. The catalyst bed was then cooled to 500° F. and brought up to 1000 p.s.i.g. pressure with $H_2$. The hydrocracking tests were conducted feeding (1) a raw light catalytic cracking cycle oil and (2) catalytic cracking cycle oil in which a portion of the aromatics had been converted to naphthenes by treating with $H_2$.

TABLE VII

| Feed | Treated Cycle Oil | Raw Cycle Oil |
|---|---|---|
| Operating Conditions: | | |
| Temperature, °F | 500 | 555 555 |
| Pressure, p.s.i.g | 1,000 | 1,000 1,000 |
| Feed Rate, v./v./hr | 1.0 | 1.0 1.0 |
| $H_2$ Added, s.c.f./b | 10,000 | 10,000 10,000 |
| Yields, Wt. percent: | | |
| $C_3$-Dry Gas | 0.4 | 0.7 0.5 |
| $C_4$ | 0.2 | 1.1 0.3 |
| $C_5$-430° F | 17.0 | 56.0 20.2 |
| 430° F.+ | 82.4 | 42.2 79.0 |
| Naphtha Quality: API Gravity, °API | 49.3 | 59.3 49.8 |
| ASTM Distillation: | | |
| Initial | 111 | 90 96 |
| 5% | 163 | 127 145 |
| 10% | 194 | 150 173 |
| 50% | 300 | 266 305 |
| 90% | 375 | 368 387 |
| FBP | 409 | 395 412 |
| Residue, Vol. percent | 1 | 1 1 |

These data show that the catalyst of the present invention possesses considerable hydrocracking activity.

Having described the present invention, that which is sought to be protected is set forth in the following claims.

What is claimed is:

1. An improved process for preparing crystalline alumino-silicate zeolite catalyst for use in fluidized bed operation which comprises maintaining a silica hydrosol at a pH in the range of 4.8 to 6.5 to allow said silica hydrosol to convert to a hydrogel, reverting said hydrogel to a hydrosol and admixing therewith a crystalline alumino-silicate zeolite, subjecting the admixture of silica and crystalline alumino-silicate zeolite to spray drying to form a material comprising zeolite embedded in a siliceous mixture and characterized by high porosity and spherical particle structure thereby being obtained.

2. Process of claim 1 wherein said crystalline alumino-silicate zeolite has an effective pore diameter of 6 to 15 Angstrom units and a silica to alumina mol ratio above 3.

3. The process of claim 1 wherein said crystalline alumino-silicate zeolite has been subjected to base exchange with a metal selected from the group comprising Groups II, III, IV, V, VIB, VIIB, VIII and rare earth metals to reduce $Na_2O$ content to less than 10 wt. percent.

4. An improved process for preparing a catalytic cracking catalyst which comprises forming a silica hydrosol, adjusting the pH of said hydrosol to a value in the range of 5 to 6 to allow said sol to revert to a gel thereafter adding a crystalline alumino-silicate zeolite having an effective pore diameter of 6 to 15 Angstrom units, said zeolite having been base exchanged with magnesium to reduce its $Na_2O$ content to less than 10 wt. percent, and having a silica to alumina molar ratio of more than 3, thereafter subjecting said admixture of silica and zeolite to spray drying to form particles of crystalline zeolite embedded in a siliceous matrix, said structure being characterized by its relatively high porosity and spherical nature.

5. The process of claim 4 wherein said resulting particles of zeolite embedded in a siliceous matrix have an average particle size in the range of about 20 to 80 microns.

6. The process of claim 3, wherein said base exchange is performed subsequent to said spray drying.

7. The process of claim 1, wherein said crystalline alumino-silicate zeolite has been subjected to base exchange with a hydrogen-containing cation to reduce its $Na_2O$ content to less than 10 wt. percent.

8. The process of claim 7, which additionally comprises depositing a platinum group metal on said crystalline alumino-silicate zeolite.

9. The process of claim 7, wherein said base exchange is performed subsequent to said spray drying.

10. The process of claim 9 which additionally comprises depositing a platinum group metal on said zeolite subsequent to said base exchange.

References Cited
UNITED STATES PATENTS

| 2,865,867 | 12/1958 | Van Dyke et al. | 252—455 |
| 2,916,437 | 12/1959 | Gilbert | 208—120 |
| 2,971,903 | 2/1961 | Kimberlin et al. | 208—119 |
| 3,013,989 | 12/1961 | Freeman | 252—455 |
| 3,033,778 | 5/1962 | Frillett | 208—120 |
| 3,130,006 | 4/1964 | Rabo et al. | 23—110 |
| 3,140,249 | 7/1964 | Plank et al. | 208—120 |
| 3,236,761 | 2/1966 | Rabo et al. | 208—111 |
| 3,236,762 | 2/1966 | Rabo et al. | 208—111 |

ABRAHAM RIMENS, *Primary Examiner.*

MAURICE A. BRINDISI, EDWARD J. MEROS, DELBERT E. GANTZ, *Examiners.*